US012138907B2

(12) United States Patent
Misawa et al.

(10) Patent No.: US 12,138,907 B2
(45) **Date of Patent: *Nov. 12, 2024**

(54) RECORDING DEVICE INCLUDING A RECORDING-TIME TRANSPORT PATH AND REVERSING PATH

(71) Applicant: SEIKO EPSON CORPORATION, Tokyo (JP)

(72) Inventors: Yuji Misawa, Matsumoto (JP); Toshihiro Imae, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/332,569

(22) Filed: Jun. 9, 2023

(65) Prior Publication Data

US 2023/0331003 A1 Oct. 19, 2023

Related U.S. Application Data

(63) Continuation of application No. 17/815,496, filed on Jul. 27, 2022, now Pat. No. 11,707,936, which is a (Continued)

(30) Foreign Application Priority Data

Jan. 31, 2020 (JP) ................................ 2020-014857

(51) Int. Cl.
*B41J 11/00* (2006.01)
*B41J 2/175* (2006.01)
(Continued)

(52) U.S. Cl.
CPC ........... *B41J 11/005* (2013.01); *B41J 2/1752* (2013.01); *B41J 3/60* (2013.01); *B41J 11/0055* (2013.01);
(Continued)

(58) Field of Classification Search
CPC . B41J 11/005; B41J 2/1752; B41J 3/60; B41J 11/0055; B41J 13/00; B41J 13/0009;
(Continued)

(56) References Cited

U.S. PATENT DOCUMENTS 5,467,182 A 11/1995 Hower, Jr. et al.
9,566,806 B2 2/2017 Taguchi et al.
(Continued)

FOREIGN PATENT DOCUMENTS

CN 110647019 1/2020
JP 2018-130936 8/2018
(Continued)

*Primary Examiner* — Henok D Legesse

(74) *Attorney, Agent, or Firm* — WORKMAN NYDEGGER

(57) ABSTRACT

A recording device has: a recording head configured to perform recording on a medium; a medium storage below the recording head configured to store the medium to be recoded; a supply path comprising a first curved supply path curved so as to be convex upward and transporting the medium fed out of the medium storage in a reversed direction via the first curved supply path; and a reversing path comprising a second curved path curved so as to be convex downward and transporting the recorded medium into a direction including a vertically upward component via second curved path from a direction including a vertically downward component; wherein the supply path joins the reversing path, and the first curved path and the second curved path overlap when viewed horizontally.

14 Claims, 3 Drawing Sheets

Related U.S. Application Data continuation of application No. 17/160,800, filed on Jan. 28, 2021, now Pat. No. 11,413,887.

(51) Int. Cl.

| | |
|---|---|
| ***B41J 3/60*** | (2006.01) |
| ***B41J 13/00*** | (2006.01) |
| ***B41J 13/10*** | (2006.01) |
| ***B41J 25/24*** | (2006.01) |
| ***B41J 25/308*** | (2006.01) |
| *B41J 2/01* | (2006.01) |
| *B41J 2/165* | (2006.01) |
| *B41J 2/17* | (2006.01) |

(52) U.S. Cl.

CPC ........... *B41J 13/00* (2013.01); *B41J 13/0009* (2013.01); *B41J 13/103* (2013.01); *B41J 25/24* (2013.01); *B41J 25/308* (2013.01); *B41J 2/01* (2013.01); *B41J 2/16508* (2013.01); *B41J 2/16526* (2013.01); *B41J 2/16585* (2013.01); *B41J 2/1721* (2013.01)

(58) Field of Classification Search

CPC ........ B41J 13/103; B41J 25/24; B41J 25/308; B41J 2/01; B41J 2/16508; B41J 2/16526; B41J 2/16585; B41J 2/1721

See application file for complete search history.

(56) References Cited

U.S. PATENT DOCUMENTS

| | | | | |
|---|---|---|---|---|
| 11,413,887 | B2 * | 8/2022 | Misawa | B41J 3/60 |
| 11,707,936 | B2 | 7/2023 | Misawa et al. | |
| 11,780,245 | B2 | 10/2023 | Misawa et al. | |
| 2006/0038870 | A1 | 2/2006 | Nonaka | |
| 2018/0236791 | A1 | 8/2018 | Ohashi et al. | |
| 2019/0009563 | A1 | 1/2019 | Tokisawa et al. | |
| 2020/0002112 | A1 | 1/2020 | Deno | |
| 2022/0169043 | A1 | 6/2022 | Misawa et al. | |
| 2022/0363075 | A1 | 11/2022 | Misawa et al. | |

FOREIGN PATENT DOCUMENTS

| | | |
|---|---|---|
| JP | 2019-014253 | 1/2019 |
| JP | 2021-121556 | 8/2021 |

* cited by examiner

RECORDING DEVICE INCLUDING A RECORDING-TIME TRANSPORT PATH AND REVERSING PATH

The present application is a continuation of U.S. patent application Ser. No. 17/815,496, filed Jul. 27, 2022, which is a continuation of U.S. patent application Ser. No. 17/160,800, filed Jan. 28, 2021, and granted on Aug. 16, 2022, as U.S. Pat. No. 11,413,887, which claims priority to JP Application Serial Number 2020-014857, filed Jan. 31, 2020, the disclosure of which is hereby incorporated by reference herein in its entirety.

BACKGROUND

1. Technical Field

The present disclosure relates to a recording device that performs recording on a medium.

2. Related Art

Some of recording devices typified by facsimiles, printers, and the like have a path by which a recording medium typified by a recording sheet is reversed so that recording is performed on both sides of the recording medium.

An ink jet recording devices described in JP-A-2019-14253 has a first cassette and a second cassette to store recording media. When fed out of any of these cassettes, the recording medium is fed to a position at which the recording medium faces a recording head positioned above the cassettes. Then, recording is performed on a first surface. After recording has been performed on the first surface, the recording medium is transported vertically upward and is then transported vertically downward, that is, transported so as to be switched back. The recording medium is then fed to a reversing path through which the recording medium is reversed. The recording medium is reversed on the reversing path so that the transport direction is changed from a downward transport direction to an upward transport direction, after which the recording medium is fed again to the position at which the recording medium faces the recording head. At that position, recording is performed on a second surface.

When a longer reversing path is used to reverse the recording medium, the reversing path is more advantageous in that, for example, the reversing path is adaptable to longer recording media and a time for drying can be assured. To elongate the reversing path used to reverse the recording medium in the path layout described in JP-A-2019-14253, however, it is necessary to move a structural body vertically upward, the structural body being placed vertically above the reversing path. Alternatively, it is necessary to move another structural body vertically downward, the other structural body being placed vertically below a curved path by which the recording medium is reversed so that its downward transport direction is changed to an upward transport direction. This increases the height of the recording device.

SUMMARY

An aspect of the present disclosure that solves the above problem is a recording device that has: a recording head that performs recording on a medium; at least one medium storage that stores the medium before recording, the medium storage being positioned vertically below the recording head; a supply path through which the medium fed out of the medium storage passes through a first curved supply path curved so as to be convex upward to reverse the medium in a transport direction including a component in a direction opposite to a direction in which the medium was fed out of the medium storage; and a reversing path by which the medium that passed through a position at which the medium faces the recording head is reversed in a direction including a vertically upward component by being transported in a transport direction including a vertically downward component and being made to pass through a second curved path curved so as to be convex downward. The supply path joins the reversing path. At least part of the first curved path and at least part of the second curved path overlap each other when viewed horizontally.

DESCRIPTION OF EXEMPLARY EMBODIMENTS

Figure 1:
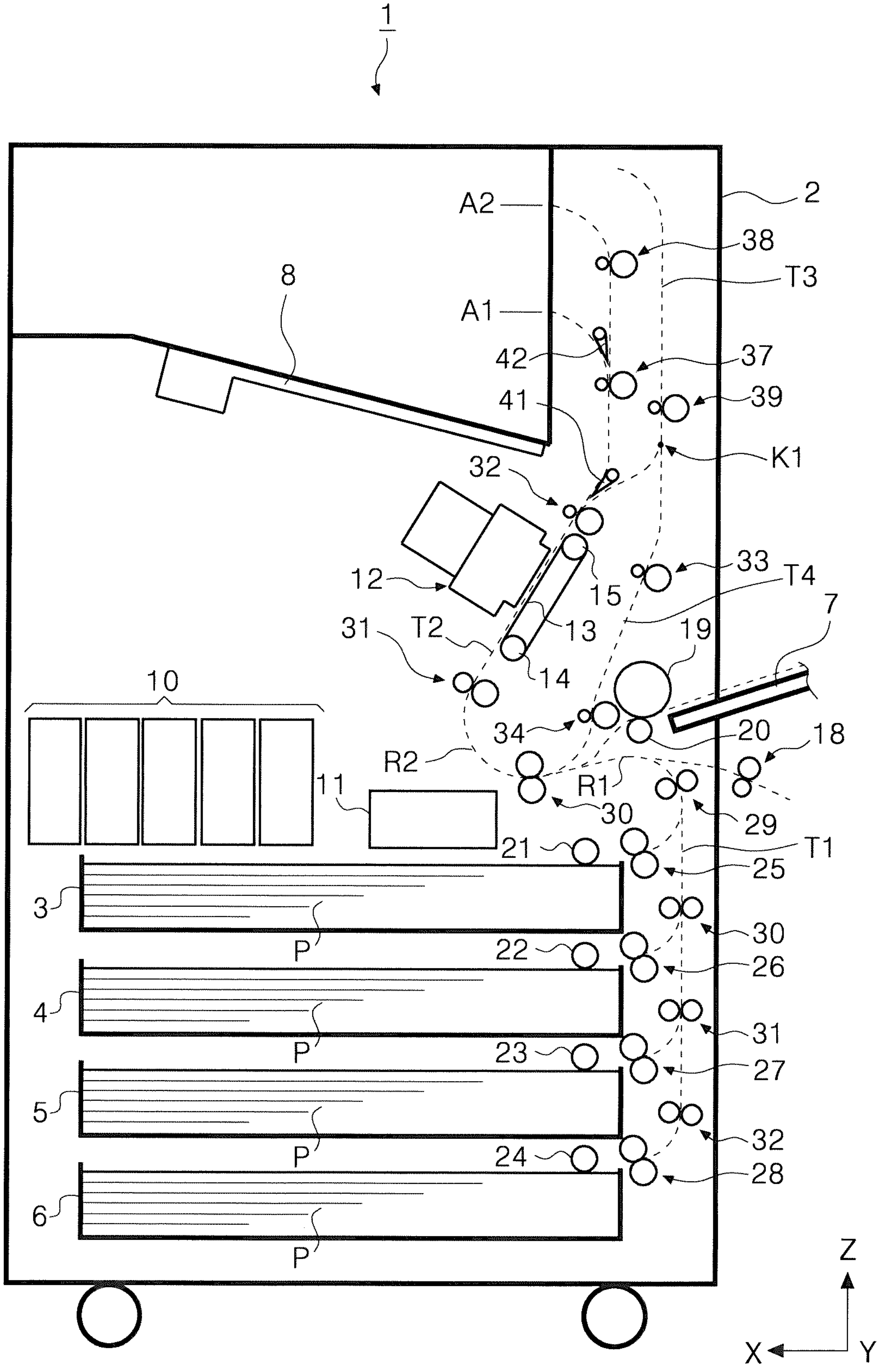
FIG. 1 illustrates medium transport paths in an ink jet printer in an embodiment.

A general description of the present disclosure will be given below.

A recording device according to a first aspect has: a recording head that performs recording on a medium; at least one medium storage that stores the medium before recording, the medium storage being positioned vertically below the recording head; a supply path through which the medium fed out of the medium storage passes through a first curved supply path curved so as to be convex upward to reverse the medium in a transport direction including a component in a direction opposite to a direction in which the medium was fed out of the medium storage; and a reversing path by which the medium that passed through a position at which the medium faces the recording head is reversed in a direction including a vertically upward component by being transported in a transport direction including a vertically downward component and being made to pass through a second curved path curved so as to be convex downward. The supply path joins the reversing path. At least part of the first curved path and at least part of the second curved path overlap when viewed horizontally.

According to this aspect, the supply path joins the reversing path, and at least part of the first curved path and at least part of the second curved path overlap when viewed horizontally. Therefore, even if the first curved path is placed at a lower position to assure a sufficient length of the reversing path, it is possible to restrain the size of the recording device in its height direction from becoming large.

In a second aspect, in the recording device according to the first aspect, the lower end of the second curved path in the vertical direction is vertically below the upper end of the first curved path in the vertical direction.

According to this aspect, the lower end of the second curved path in the vertical direction is vertically below the upper end of the first curved path in the vertical direction. Therefore, even if the first curved path is placed at a lower position to assure a sufficient length of the reversing path, it is possible to restrain the size of the recording device in its height direction from becoming large.

In a third aspect, in the recording device according to the second aspect, the recording device further has: a first transport roller that transports the medium, the first transport roller being disposed upstream of the upper end of the first curved path; and a second transport roller that transports the medium, the second transport roller being disposed downstream of the upper end of the first curved path. The supply path and the reversing path join together between the first transport roller and the second transport roller.

According to this aspect, the second transport roller can be used to transport the medium that has passed through the supply path and the medium that has passed through the reversing path.

In a fourth aspect, in the recording device according to the third aspect, the recording device further has a plurality of transport roller pairs that transport the medium, the plurality of transport roller pairs being disposed downstream of a position, on the second curved path, at which the supply path and the reversing path join together.

According to this aspect, even if the first curved path is placed at a lower position, the medium can be transported.

In a fifth aspect, in the recording device according to the fourth aspect, the recording device further has two transport roller pairs that transport the medium, the two transport roller pairs being disposed downstream of the position, on the second curved path, at which the supply path and the reversing path join together.

According to this aspect, even if the first curved path is placed at a lower position, the medium can be transported.

In a sixth aspect, in the recording device according to the first to fifth aspects, the curvature of the second curved path is larger than the curvature of the first curved path.

According to this aspect, the curvature of the second curved path is larger than the curvature of the first curved path. Therefore, when the medium is curved on the second curved path, that is, the medium that has been subject to recording on a first surface is curved, the curve can be made more gentle than when the medium is curved on the first curved path, that is, the medium yet to be subject to recording on the first surface and a second surface is curved. That is, since the medium that has been subject to recording is curved more gentle, the medium is less likely to suffer from damage such as wrinkles, leading to a superior recording result.

In a seventh aspect, in the recording device according to the first to sixth aspects, the recording device further has a liquid storage; the recording head is composed of a liquid discharge head that discharges a liquid to the medium; the liquid storage stores the liquid to be discharged from the liquid discharge head, the liquid storage being disposed between the liquid discharge head and the medium storage in the vertical direction; and at least part of the liquid storage, at least part of the first curved path, and at least part of the second curved path overlap when viewed horizontally.

According to this aspect, at least part of the, at least part of the first curved path, and at least part of the second curved path overlap one another when viewed horizontally. Therefore, it is possible to restrain the size of the recording device in its height direction from becoming large.

In an eighth aspect, in the recording device according to the seventh aspect, the liquid storage and the lower end of the second curved path in the vertical direction overlap when viewed horizontally; and the liquid storage and the upper end of the first curved path in the vertical direction overlap when viewed horizontally.

According to this aspect, the liquid storage and the lower end of the second curved path in the vertical direction overlap when viewed horizontally; and the liquid storage and the upper end of the first curved path in the vertical direction overlap when viewed horizontally. Therefore, it is possible to restrain the size of the recording device in its height direction from becoming large.

In a ninth aspect, in the recording device according to the eighth aspect, the recording device further has an effluent storage that holds an effluent discharged from the liquid discharge head, the effluent storage being disposed between the liquid discharge head and the medium storage in the vertical direction. The effluent storage and the lower end of the second curved path in the vertical direction do not overlap when viewed horizontally.

According to this aspect, the effluent storage and the lower end of the second curved path in the vertical direction do not overlap when viewed horizontally. Therefore, the curvature of the second curved path is easily made to be small.

In a tenth aspect, in the recording device according to the ninth aspect, there are matches between some horizontal positions of the second curved path and some horizontal positions of the effluent storage.

According to this aspect, there are matches between some horizontal positions of the second curved path and some horizontal positions of the effluent storage. Therefore, the curvature of the second curved path is easily made to be small.

In an eleventh aspect, in the recording device according to the sixth to tenth aspects, there is no match between any horizontal position of the second curved path and any horizontal position of the liquid storage.

According to this aspect, there is no match between any horizontal positions of the second curved path and any horizontal position of the liquid storage. Therefore, the curvature of the second curved path is easily made to be small.

In a twelfth aspect, in the recording device according to any one of the first to eleventh aspects, the recording device further has a transport path that passes through a position at which the transport path faces the recording head, the transport path forming an angle with respect to the horizontal direction and vertical direction to transport the medium upward.

According to this aspect, a transport path passing through a position at which the transport path faces the recording head forms an angle with respect to the horizontal direction and vertical direction to transport the medium upward. Therefore, it is possible to restrain the horizontal size of the recording device from becoming large.

In a thirteenth aspect, in the recording device according to the twelfth aspect, there is a match between a horizontal position of the second curved path and the horizontal position of an ejection position from which to eject the medium to an ejection tray.

According to this aspect, there is a match between a horizontal position of the second curved path and the horizontal position of an ejection position from which to eject the medium to an ejection tray. Therefore, it is possible to restrain the horizontal size of the recording device from becoming large.

In a fourteenth aspect, in the recording device according to the thirteenth aspect, the second curved path is provided toward both horizontal sides of the horizontal position of the ejection position.

According to this aspect, the second curved path is provided toward both horizontal sides of the horizontal position of the ejection position. Therefore, it is possible to restrain the horizontal size of the recording device from becoming large.

In a fifteenth aspect, in the recording device according to any one of the first to fourteenth aspects, the recording device further has a supply roller located vertically above the first curved path, the supply roller feeding the medium to the interior of the recording device through a supply tray protruding from a side surface of the recording device toward the outside of the recording device; the reversing path includes a downward transport path located upstream of the second curved path, the downward transport path being inclined in a direction toward the central portion of the recording device from an outer surface of the recording device, the downward transport path being used to transport the medium in a transport direction including a vertically downward component; and at least part of the downward transport path and at least part of the supply roller overlap when viewed vertically.

According to this aspect, the downward transport path is inclined and at least part of the supply roller enters a space formed by the inclination of the downward transport path. Therefore, it is possible to restrain the size of the recording device in its height direction from becoming large.

In a sixteenth aspect, in the recording device according to the fifteenth aspect, after the medium is fed to the interior of the recording device through the supply tray, the medium enters the reversing path.

According to this aspect, in the structure in which the medium to be fed to the interior of the recording device through the supply tray enters the reversing path, the effect in the fifteenth aspect described above is obtained.

In a seventeenth aspect, in the recording device according to the sixteenth aspect, the medium to be fed to the interior of the recording device through the supply tray enters the supply path at a position on the supply path, the position being downstream of the upper end of the first curved path in the vertical direction.

According to this aspect, the medium to be fed to the interior of the recording device through the supply tray enters the supply path at a position on the supply path, the position being downstream of the upper end of the first curved path in the vertical direction. Therefore, the medium supplied from the supply tray is less likely to suffer from damage such as wrinkles, leading to a superior recording result.

In an eighteenth aspect, in the recording device according to the seventeenth aspect, the medium to be fed to the interior of the recording device through the supply tray enters the supply path at a position on the supply path, the position being upstream of a position at which the supply path and the reversing path join together.

According to this aspect, the medium to be fed to the interior of the recording device through the supply tray enters the supply path at a position on the supply path, the position being upstream of the position at which the supply path and the reversing path join together. Therefore, it is possible to restrain the size of the recording device in its height direction from becoming large.

An embodiment of the present disclosure will be concretely described below.

An ink jet printer 1 will be described below as an example of a recording device. The ink jet printer 1 discharges an ink, which is an example of a liquid, to a medium typified by a recording sheet to perform recording. In the description below, the ink jet printer 1 will be simply referred to as the printer 1.

In the drawings, the X-Y-Z coordinate system is an orthogonal coordinate system. The Y-axis direction is a medium width direction crossing a transport direction in which the medium is transported. The Y-axis direction is also the depth direction of the printer 1. The X-axis direction is the width direction of the printer 1; when viewed from the operator of the printer 1, the +X direction is toward the left side and the −X direction is toward the right side. The Z-axis direction is the vertical direction, that is, the height direction of the printer 1; the +Z direction is upward and the −Z direction is downward.

In the description below, a side toward which the medium is fed will be referred to as a downstream and a side opposite to the downstream will sometimes be referred to as an upstream. In the drawings, medium transport paths are indicated by dashed lines. In the printer 1, the medium is transported along medium transport paths indicated by dashed lines.

The printer 1 has a plurality of medium cassettes at the bottom of a device body 2 so as to be placed vertically. In this embodiment, a first medium cassette 3 is placed at the topmost position, followed by a second medium cassette 4, a third medium cassette 5, and a fourth medium cassette 6 in that order toward the downward direction. The reference symbol P indicates a medium stored in the relevant medium cassette. Each medium cassette is an example of a medium storage.

For each medium cassette, a pick roller is provided that feeds out a stored medium in the −X direction. A pick roller 21 is attached to the first medium cassette 3, a pick roller 22 is attached to the second medium cassette 4, a pick roller 23 is attached to the third medium cassette 5, and a pick roller 24 is attached to the fourth medium cassette 6.

For each medium cassette, a supply roller pair is also provided that supplies the medium that has been fed out in the −X direction, the medium being supplied in a diagonally upward direction including a −X-direction component and a +Z-direction component. A supply roller pair 25 is attached to the first medium cassette 3, a supply roller pair 26 is attached to the second medium cassette 4, a supply roller pair 27 is attached to the third medium cassette 5, and a supply roller pair 28 is attached to the fourth medium cassette 6.

Unless otherwise noted in the description below, each roller pair will be assumed to have a driving roller driven by a motor (not illustrated) and a driven roller that is in contact with the driving roller so as to be rotated by it.

When the medium is fed out of the first medium cassette 3 and is fed by the supply roller pair 25 in a diagonally upward direction, the medium receives a feed force from a transport roller pair 29 and is further fed in a diagonally upward direction including a +X-direction component and a +Z-direction component.

When the medium is fed out of the second medium cassette 4 and is fed by the supply roller pair 26 in a diagonally upward direction, the medium receives a feed force from a transport roller pair 30 and is further fed upward, after which the medium reaches the transport roller pair 29.

When the medium is fed out of the third medium cassette 5 and is fed by the supply roller pair 27 in a diagonally upward direction, the medium is further fed upward by a transport roller pair 31 and the transport roller pair 30, after which the medium reaches the transport roller pair 29.

When the medium is fed out of the fourth medium cassette 6 and is fed by the supply roller pair 28 in a diagonally upward direction, the medium is further fed upward by a transport roller pair 32, the transport roller pair 31, and the transport roller pair 30, after which the medium reaches the transport roller pair 29.

The transport roller pair 29 feeds the medium in a diagonally upward direction including a +X-direction component and a +Z-direction component as with the supply roller pairs described above.

A medium transport path formed downstream of the transport roller pair 29 is curved so as to be convex upward. The medium passes through this curved path portion and reaches another transport roller pair 30. In the description below, a medium transport path through which the medium is fed out of each medium cassette passes until the medium reaches the other transport roller pair 30 will be referred to as a supply path T1. Of the supply path T1, the path curved between the transport roller pair 29 and the other transport roller pair 30 so as to be convex upward will be referred to as a first curved path R1. Due to the supply path T1, the medium fed out of the relevant medium is reversed in a transport direction including a component in the +X direction opposite to the direction in which the medium has been fed out of the medium cassette, that is, the −X-direction. This supply path T1 joins a reversing path T4, which will be described later, in the vicinity of the upstream of the other transport roller pair 30.

An external transport roller pair 18, illustrated in the vicinity of the transport roller pair 29 and outside the device body 2, is provided in an additional unit (not illustrated in FIG. 1). This additional unit is structured so that media can be stored and that a medium fed out of a feed roller (not illustrated) can be supplied to the interior of the printer 1 by the external transport roller pair 18.

A supply tray 7 is provided in the vicinity of the first curved path R1 so as to protrude from a side surface of the device body 2 toward the outside of the printer 1. The supply tray 7 is intended for manual feed of a medium. The medium is supplied by a supply roller 19 and a separation roller 20 from the supply tray 7 to the interior of the printer 1. The medium to be fed from the supply tray 7 to the interior of the printer 1 enters the supply path T1, after which the medium further enters the reversing path T4, which will be described later.

The medium then receives a feed force from the transport roller pair 29, passes through a curved path curved so as to be convex downward, and reaches the transport roller pair 31. In the description below, the curved path curved between a transport roller pair 34 and the transport roller pair 31 so as to be convex downward will be referred to as a second curved path R2. The second curved path R2 is part of the reversing path T4, which will be described later.

The medium receives a feed force from the transport roller pair 31 and is fed to a position between a transport belt 13 and a line head 12, which is an example of a recording head and a liquid discharge head, that is, a recording position at which the medium faces the line head 12. In the description below, a medium transport path from the transport roller pair 31 to the transport roller pair 32 will be referred to as a recording-time transport path T2.

The line head 12 executes printing by discharging an ink, which is an example of a liquid, to a surface of the medium. The line head 12 is an ink discharge head structured so that nozzles that discharge inks cover the entire area of the medium in its width direction. Specifically, the line head 12 is structured as an ink discharge head that can perform printing in the entire area of the medium in its width direction without having to move in the width direction of the medium. However, the ink discharge head is not limited to this type of head. The ink discharge head may be of a type in which the ink discharge head is mounted on a carriage and discharges an ink while moving in the width direction of the medium.

In the drawings, the reference numeral 10 indicates an ink storage, used as a liquid storage, that stores an ink. Ink to be discharged from the line head 12 is supplied from the ink storage 10 through a tube (not illustrated) to the line head 12. The ink storage 10 is comprised of a plurality of ink tanks placed along the X-axis direction.

The reference numeral 11 indicates an effluent storage that holds an ink that has been discharged from the line head 12 toward a flushing cap (not illustrated) for maintenance and has become an effluent.

The transport belt 13 is an endless belt placed on a pulley 14 and a pulley 15. At least one of the pulley 14 and pulley 15 is driven by a motor (not illustrated) to rotate the transport belt 13. The medium is transported through a position at which the medium faces the line head 12 while adhering to the belt surface of the transport belt 13. To have the medium adhere to the transport belt 13, a known adhesion method such as an air adhesion method or an electrostatic adhesion method can be used.

The recording-time transport path T2 passing through the position at which the recording-time transport path T2 faces the line head 12 forms an angle with respect to the horizontal and vertical directions to transport the medium upward. This upward transport direction is a direction including a −X-direction component and a +Z-direction component in FIG. 1. This structure makes it possible to restrain the horizontal size of the printer 1 from becoming large.

In this embodiment, the recording-time transport path T2 is inclined within the range from 50° to 70° with respect to the horizontal direction. Specifically, the recording-time transport path T2 is inclined at an angle of about 60°.

After recording has been performed on a first surface of the medium by the line head 12, the medium is further fed by the transport roller pair 32 positioned downstream of the transport belt 13 in a diagonally upward direction including a −X-direction component and a +Z-direction component.

A flap 41 is provided downstream of the transport roller pair 32. The flap 41 switches the transport direction of the medium. When the medium is to be ejected without being subject to further recording, the transport path for the medium is switched by the flap 41 so as to be directed toward the transport roller pair 37 above the flap 41. A flap 42 is also provided downstream of the transport roller pair 37. The transport path is switched by this flap 42 so that either ejection from an ejection position A1 or transport to a transport roller pair 38 is performed, the transport roller pair 38 being positioned vertically above the flap 42. When the medium is fed toward the transport roller pair 38, the medium is ejected from an ejection position A2.

When the medium is ejected from the ejection position A1, the medium is accepted by an ejection tray 8 inclined in a diagonally upward direction including a +X-direction component and a +Z-direction component. When the medium is ejected from the ejection position A2, the medium is accepted by an optional tray (not illustrated).

When recording is to be performed on a second surface of the medium besides the first surface, the medium is fed by the flap 41 in a diagonally upward direction including a −X-direction component and a +Z-direction component, passes through a branch position K1, and enters a switch-back path T3. In this embodiment, the switch-back path T3 is a medium transport path extending upward from the branch position K1. The transport roller pair 39 is provided beside the switch-back path T3. When the medium enters the switch-back path T3, the medium is transported upward by the transport roller pair 39. When the rear edge of the medium passes through the branch position K1, the rotational direction of the transport roller pair 39 is switched to transport the medium downward.

The reversing path T4 is coupled to the switch-back path T3. In this embodiment, the reversing path T4 starts from the branch position K1, passes through a transport roller pair 33, the transport roller pair 34 and the other transport roller pair 30, and terminates at the transport roller pair 31. The reversing path T4 includes the second curved path R2 described above.

When the medium is transported downward by the transport roller pair 33, the medium receives a feed force from the transport roller pairs 33 and 34, and arrives at the other transport roller pair 30, after which the medium is fed again by the other transport roller pair 30 to the position at which the medium faces the line head 12. That is, the reversing path T4 is used to transport the medium in a transport direction including a vertically downward component, to cause the medium to pass through the second curved path R2 curved so as to be convex downward, and to reverse the medium in a transport direction including a vertically upward component.

When the medium is fed again to the position at which the medium faces the line head 12, the second surface of the medium faces the line head 12, the second surface being opposite to the first surface on which recording has been already performed. Thus, the second surface of the medium becomes ready for recording by the line head 12. When recording is performed on the second surface of the medium, it is ejected from the ejection position A1 or A2.

The structure of the medium transport paths will be further described below with reference to FIG. 2.

Figure 2:
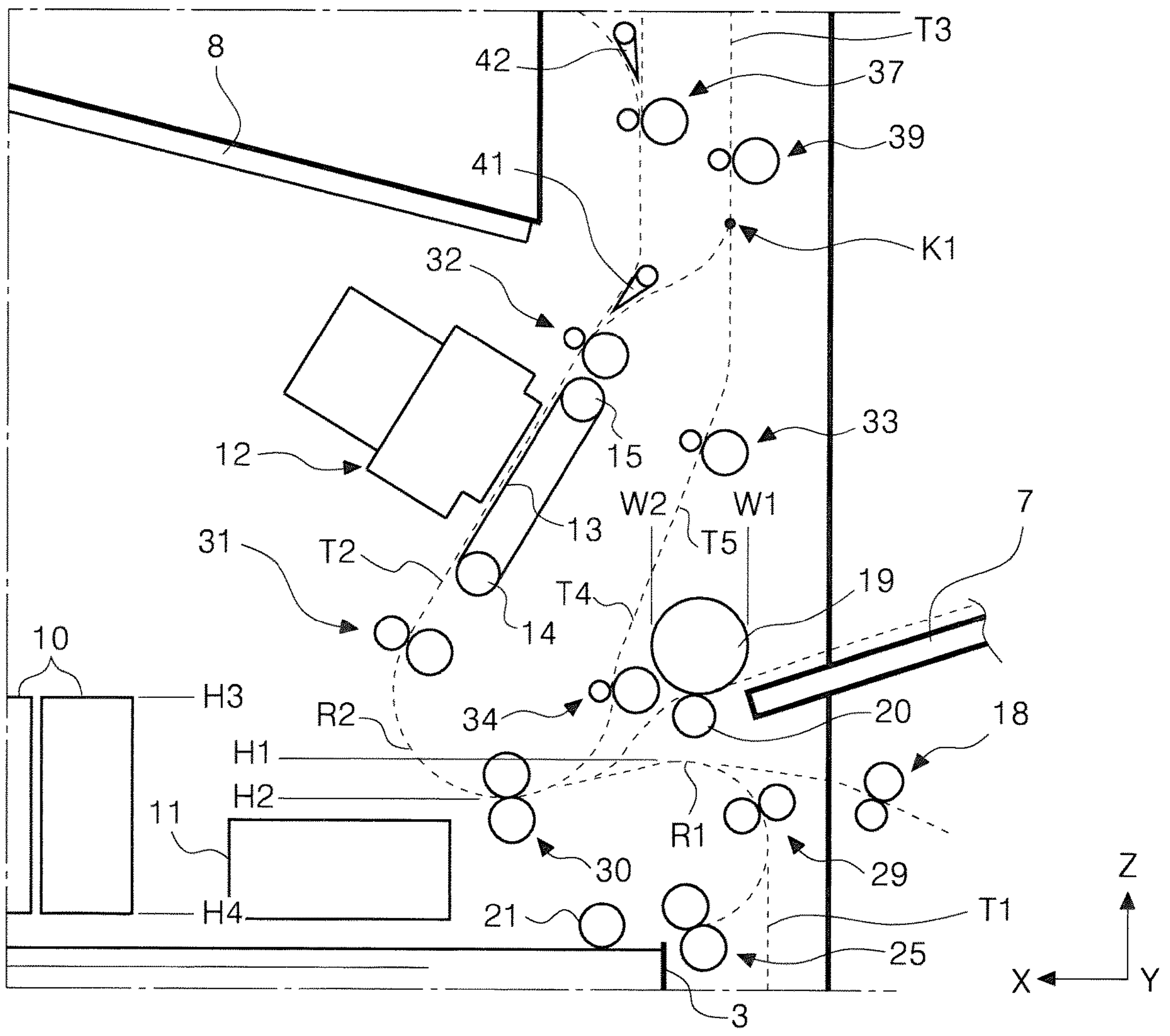
FIG. 2 is partially enlarged view of the ink jet printer in FIG. 1.

In FIG. 2, the position H1 is the upper end of the first curved path R1 in the vertical direction and the position H2 is the lower end of the second curved path R2 in the vertical direction. The position H1 in the vertical direction is above the position H2. That is, at least part of the first curved path R1 and at least part of the second curved path R2 overlap each other when viewed from the X-axis direction, which is along the horizontal direction. In other words, there is an overlap in the vertical direction between the first curved path R1 and the second curved path R2.

Therefore, even if the second curved path R2 is placed at a lower position to assure a sufficient length of the reversing path T4, it is possible to restrain the size of the printer 1 in its height direction from becoming large.

Although, in this embodiment, part of the first curved path R1 and part of the second curved path R2 overlap each other when viewed from the X-axis direction, the whole of the first curved path R1 may overlap part of the second curved path R2 or the whole of the second curved path R2 may overlap part of the first curved path R1.

In this embodiment, the curvature of the second curved path R2 is larger than the curvature of the first curved path R1. Therefore, when the medium is curved on the second curved path R2, the curve can be made more gentle than when the medium is curved on the first curved path R1, that is, when the medium yet to be subject to recording on the first surface and second surface is curved. That is, since the medium the stiffness of which has been lowered due to printing already performed on the medium is curved more gentle, the medium is less likely to suffer from damage such as wrinkles, leading to a superior recording result.

In this embodiment, the ink storage 10 is disposed between the line head 12 and the first medium cassette 3 in the vertical direction. In FIG. 2, the position H3 is the upper end of the ink storage 10 in the vertical direction and the positions H4 is the lower end of the ink storage 10 in the vertical direction. The positions H1 and H2 are between the positions H3 and H4. That is, at least part of the ink storage 10, at least part of the first curved path R1, and at least part of the second curved path R2 overlap one another when viewed from the X-axis direction, which is along the horizontal direction. In other words, there is an overlap in the vertical direction between at least part of the ink storage 10, at least part of the first curved path R1, and at least part of the second curved path R2. This structure makes it possible to restrain the size of the printer 1 in its height direction from becoming large.

In the reversing path T4, a downward transport path T5 is included upstream of the second curved path R2 so as to be inclined in a direction toward the central portion of the printer 1 from an outer surface of the printer 1. The medium is transported through the downward transport path T5 in a transport direction including a vertically downward component. The downward transport path T5, which is part of the reversing path T4, is a linear path extending from the vicinity of the upstream of the transport roller pair 33 to the transport roller pair 34.

Since this linear downward transport path T5 is inclined, a space is formed below the downward transport path T5. The supply roller 19 is placed in this space. In FIG. 2, the position W1 is the end of the supply roller 19 in the −X direction and the position W2 is the end of the supply roller 19 in the +X direction. As is clear from FIG. 2, at least part of the downward transport path T5 and at least part of the supply roller 19 overlap each other when viewed vertically. In other words, there is an overlap in the horizontal direction between at least part of the downward transport path T5 and at least part of the supply roller 19. This structure makes it possible to restrain the size of the printer 1 in the horizontal direction from becoming large.

Although, in this embodiment, part of the downward transport path T5 and part of the supply roller 19 overlap each other when viewed vertically, the whole of the downward transport path T5 may overlap part of the supply roller 19 or the whole of the supply roller 19 may overlap part of the downward transport path T5.

The present disclosure is not limited to the embodiment described above. Various variations are possible without departing from the intended scope of the present disclosure described in the claims. It will be understood that these variations are also included in the range of the present disclosure.

For example, although, in the embodiment described above, the recording-time transport path T2 is inclined upward, the recording-time transport path T2 may be formed along the vertical direction or horizontal direction.

Another example is that although, in the embodiment described above, the downward transport path T5 is inclined downward, if an overlap in the horizontal direction between the downward transport path T5 and the supply roller 19 does not need to be considered, the downward transport path T5 may be formed along the vertical direction.

Another example is that a supply unit that supplies a medium from the supply tray 7 and another supply unit by which a medium is supplied from the additional unit by the external transport roller pair 18 may be eliminated.

Figure 3:
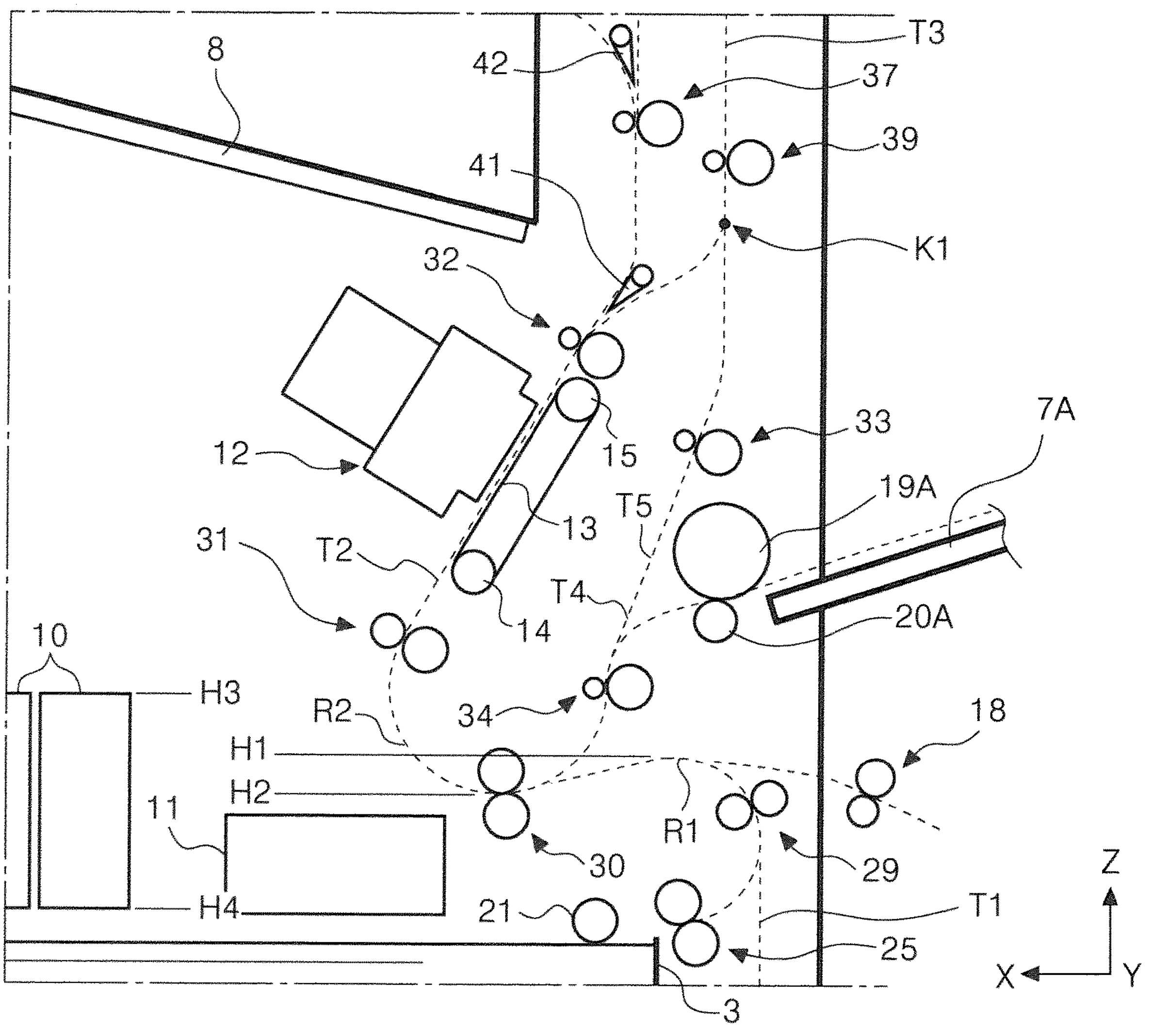
FIG. 3 illustrates an ink jet printer in another embodiment.

Another example is that the medium that would otherwise be supplied by the supply roller 19 and separation roller 20 from the supply tray 7 to the interior of the printer 1 may enter the reversing path T4 as illustrated in FIG. 3. In this structure, a supply tray, a supply roller, and a separation roller, which are respectively denoted by the reference characters 7A, 19A, and 20A in FIG. 3, can be provided at upper positions in the vertical direction as illustrated in FIG. 3. That is, the degree of freedom in the placement of the supply tray, supply roller, and separation roller can be improved.

What is claimed is:

1. A recording device comprising:

a recording head configured to perform recording on a medium by discharging a liquid to the medium;

at least one medium storage configured to store the medium to be recorded, the medium storage positioned vertically below the recording head;

an effluent storage that holds an effluent discharged from the recording head, the effluent storage being disposed between the recording head and the medium storage in the vertical direction;

a recording-time transport path that passes through a position which faces the recording head;

a supply path comprising a first curved supply path curved so as to be convex upward and transporting the medium fed out of the medium storage in a direction including a component in a direction opposite to a direction in which the medium is fed out of the medium storage via the first curved supply path; and a reversing path comprising a second curved path curved so as to be convex downward and transporting the recorded medium into a direction including a vertically upward component via second curved path from a direction including a vertically downward component; wherein the reversing path joins the recording-time transport path, the supply path joins the reversing path which joins the recording-time transport path, and the effluent storage and a lower end of the second curve path in the vertical direction do not overlap when viewed horizontally.

2. The recording device according to claim 1, wherein there are matches between some horizontal positions of the second curved path and some horizontal positions of the effluent storage.

3. The recording device according to claim 1, further comprising a liquid storage configured to store the liquid to be discharged from the recording head, wherein:

there is no match between any horizontal position of the second curved path and any horizontal position of the liquid storage.

4. The recording device according to claim 1, further comprising a liquid storage, wherein:

the liquid storage stores the liquid to be discharged from the recording head, the liquid storage being disposed between the recording head and the medium storage in the vertical direction; and at least part of the liquid storage, at least part of the first curved path, and at least part of the second curved path overlap when viewed horizontally.

5. The recording device according to claim 4, wherein:

the liquid storage and a lower end of the second curved path in the vertical direction overlap when viewed horizontally; and the liquid storage and an upper end of the first curved path in the vertical direction overlap when viewed horizontally.

6. The recording device according to claim 1, wherein the recording-time transport path forms an angle with respect to the horizontal direction and vertical direction to transport the medium upward.

7. The recording device according to claim 6, wherein there is a match between a horizontal position of the second curved path and a horizontal position of an ejection position from which to eject the medium to an ejection tray.

8. The recording device according to claim 7, wherein the second curved path is provided toward both horizontal sides of the horizontal position of the ejection position.

9. The recording device according to claim 1, further comprising a supply roller located vertically above the first curved path, the supply roller feeding the medium to an interior of the recording device through a supply tray protruding from a side surface of the recording device toward an outside of the recording device, wherein:

the reversing path includes a downward transport path located upstream of the second curved path, the downward transport path being inclined in a direction toward a central portion of the recording device from an outer surface of the recording device, the downward transport path being used to transport the medium in a transport direction including a vertically downward component; and at least part of the downward transport path and at least part of the supply roller overlap when viewed vertically.

10. The recording device according to claim 9, wherein after the medium is fed to the interior of the recording device through the supply tray, the medium enters the reversing path.

11. The recording device according to claim 10, wherein the medium to be fed to the interior of the recording device through the supply tray enters the supply path at a position on the supply path, the position being downstream of an upper end of the first curved path in the vertical direction.

12. The recording device according to claim 11, wherein the medium to be fed to the interior of the recording device through the supply tray enters the supply path at a position on the supply path, the position being upstream of a position at which the supply path and the reversing path join together.

13. The recording device according to claim 1, further comprising a liquid storage, wherein:

a lower end of the second curved path in the vertical direction is vertically below an upper end of the first curved path in the vertical direction;

a curvature of the second curved path is larger than a curvature of the first curved path;

the liquid storage stores the liquid to be discharged from the recording head, the liquid storage being disposed between the recording head and the medium storage in the vertical direction;

the liquid storage and a lower end of the second curved path in the vertical direction overlap when viewed horizontally; and the liquid storage and an upper end of the first curved path in the vertical direction overlap when viewed horizontally.

14. The recording device according to claim 13, wherein:

there is a match between a horizontal position of the second curved path and a horizontal position of an ejection position from which to eject the medium to an ejection tray; and the second curved path is provided toward both horizontal sides of the ejection position.

* * * * *